(12) United States Patent
Leuck et al.

(10) Patent No.: US 9,014,426 B2
(45) Date of Patent: Apr. 21, 2015

(54) METHOD AND DEVICE FOR THE DETECTION OF MOVING OBJECTS IN A VIDEO IMAGE SEQUENCE

(71) Applicant: EADS Deutschland GmbH, Munich (DE)

(72) Inventors: Holger Leuck, Oberschleissheim (DE); Christoph Stahl, Karlskron (DE); Heiko Seidel, Geisenfeld (DE)

(73) Assignee: EADS Deutschland GmbH, Munich (DE)

( * ) Notice: Subject to any disclaimer, the term of this patent is extended or adjusted under 35 U.S.C. 154(b) by 240 days.

(21) Appl. No.: 13/666,241

(22) Filed: Nov. 1, 2012

(65) Prior Publication Data
US 2013/0108109 A1    May 2, 2013

(30) Foreign Application Priority Data
Nov. 2, 2011    (DE) .......................... 10 2011 117 408

(51) Int. Cl.
*G06K 9/00*    (2006.01)
*G06T 7/20*    (2006.01)

(52) U.S. Cl.
CPC .................................. *G06T 7/2053* (2013.01)

(58) Field of Classification Search
CPC ................. G06K 9/00771; G06T 2207/10016; G06T 7/2033; G06T 2207/30241; G06T 2207/10048; G06T 2207/30232
See application file for complete search history.

(56) References Cited

U.S. PATENT DOCUMENTS

| | | | | |
|---|---|---|---|---|
| 5,109,435 A * | 4/1992 | Lo et al. | ......................... | 382/103 |
| 5,883,969 A * | 3/1999 | Le Gouzouguec et al. | ... | 382/103 |
| 5,982,909 A * | 11/1999 | Erdem et al. | .................. | 382/103 |
| 6,031,568 A * | 2/2000 | Wakitani | ....................... | 348/169 |
| 6,298,143 B1 * | 10/2001 | Kikuchi et al. | ............... | 382/103 |
| 6,931,146 B2 * | 8/2005 | Aoki et al. | ..................... | 382/107 |
| 7,149,356 B2 * | 12/2006 | Clark et al. | ................... | 382/209 |
| 8,107,687 B2 * | 1/2012 | Gold, Jr. | ....................... | 382/107 |
| 8,116,527 B2 * | 2/2012 | Sabol et al. | ................... | 382/103 |
| 8,159,536 B2 * | 4/2012 | Wang et al. | ................... | 348/152 |

FOREIGN PATENT DOCUMENTS

DE    10 2009 017 135 A1    11/2010

OTHER PUBLICATIONS

Montera et al., Object tracking through adaptive correlation, Jan. 1994, Optical Engineering, vol. 33 No. 1, pp. 294-302.*

(Continued)

*Primary Examiner* — Barry Drennan
*Assistant Examiner* — Guillermo Rivera-Martinez
(74) *Attorney, Agent, or Firm* — Crowell & Moring LLP (57) ABSTRACT

Techniques for the detection of moving objects in a video image sequence are provided. Distinctive image variation points in a difference image are determined. An image variation threshold value is established and image variation points are determined as those points in the difference image in which the absolute image brightness value of which exceeds the image variation threshold value. The quality of the image variation points are determined based on at least one predetermined quality criterion. If the quality criterion is met, the determined image variation points determined are determined as the distinctive image variation points determined. Otherwise, the establishment of an image variation threshold value and determination of the quality of image variation points is repeated with a changed image variation threshold value.

19 Claims, 4 Drawing Sheets

(56) References Cited

OTHER PUBLICATIONS

Yilma et al., Target tracking in airborne forward looking infrared imagery, 2003, Image and Vision Computing 21, pp. 623-635.*

KaewTrakulPong et al., A real time adaptive visual surveillance system for tracking low-resolution colour targets in dynamically changing scenes, 2003, Image and Vision Computing 21, pp. 913-929.*

Zhang et al., Detecting and tracking dim moving point target in IR image sequence, 2005, Infrared Physics & Technology 46, pp. 323-328.*

Wu et al., "A robust registration method for high resolution remote sensing images", Proc.of SPIE, vol. 7147, 7140Y, 2008, http://dx.doi.org/10.1117/12.813235 (nine (9) pages).

* cited by examiner

METHOD AND DEVICE FOR THE DETECTION OF MOVING OBJECTS IN A VIDEO IMAGE SEQUENCE

BACKGROUND AND SUMMARY OF THE INVENTION

The present invention relates to the detection of moving objects in a video image sequence, in particular a method comprising the steps:

a) determining distinctive feature points in one image of a pair of consecutive images of the video image sequence, b) determining a mathematical transformation for imaging one of the two images of the pair of images onto the other of the two images of the pair of images, using the distinctive feature points determined in step a), c) determining a difference image as a difference between the images of the pair of images transformed onto one another by means of transformation determined in step b), d) determining distinctive image variation points in the difference image determined in step c), e) determining object points from the distinctive image variation points determined in step d).

Methods of this type are known, for example, from the prior art for the detection of moving objects in camera image sequences of a pan and tilt camera installed on board an aircraft. The detection is carried out with the aid of a so-called change detection, in which chronologically consecutive video images of the camera image sequence are compared to one another and image variations are determined. The moving object or objects recorded in the scenery can then be determined in real time from the image variations determined.

With respect to the reliability or quality of the known detection methods, the following problems in particular result:

If, in the course of the respective video image sequence, the recorded "image section" is changed per se, as is the case, for example with a moving and/or panning and/or tilting camera due to the changes of viewing angle and/or observation distance associated therewith (e.g., with the use of an image sensor device on board a vehicle, in particular an aircraft), the image variations resulting solely therefrom first must be compensated, which is also referred to as "image registration." With this image registration, however, substantial inaccuracies can occur in the known methods. This problem relates above all to above-referenced steps a) through c).

Moreover, chronological changes to the recording conditions (e.g., illumination) as well as the not completely avoidable recording inaccuracies that occur in practice (e.g., due to image recording noise, contrast compensation etc.) can impair the reliability or quality of the object detection method. This can cause "false alarms," i.e., incorrect image detections.

Exemplary embodiments of the present invention provide an objection detection technique of the type mentioned at the outset that is as robust as possible with respect to disturbing influences and provides a low false alarm rate.

According to a first aspect of the invention, step d), that is, the determination of "distinctive image variation points" in the previously detected difference image comprises the following steps:

d1) establishing an image variation threshold value and determining image variation points as those points in the difference image determined in step c) the absolute image brightness value of which exceeds the image variation threshold value, d2) analyzing the quality of the image variation points determined in step d1) based on at least one predetermined quality criterion, d3) if the quality criterion is met, establishing the image variation points determined in step d1) as the distinctive image variation points determined in step d) otherwise repetition of steps d1) and d2) with an image variation threshold value established in a changed manner.

The basic concept of this method design lies in that during the determination of distinctive image variation points in the previously determined difference image, an "adaptive" image variation threshold value is provided, which although initially is established in some manner in order to determine image variation points on this "experimental basis," this initial establishment is then revised as needed and a new determination of the image variation points is repeated on the basis of a image variation threshold value established in a changed manner (if a predetermined criterion has not been met). One or optionally more of such repetitions of steps d1) and d2) with the aim of meeting (or at least "better meeting") the quality criterion advantageously render possible an improvement in the robustness and a reduction in the false alarm rate of the object detection.

According to an embodiment, for which the applicant reserves the right to claim independent protection (in the sense of an independent second inventive aspect), it is provided that step a) comprises the following steps:

a1) detecting feature points in one of the two images of the pair of images, respectively in the vicinity of grid points of a grid established in advance and laid over this image, a2) determining the distinctive feature points as a selection of the feature points detected in step a1) using at least one predetermined selection criterion.

According to one embodiment, for which the applicant reserves the right to claim impendent protection (in the sense of an independent third inventive aspect), it is provided that step b) comprises the following steps:

b1) determining displacement vectors for each of the distinctive feature points determined in step a) by determining the corresponding distinctive feature points in the other of the two images of the pair of images, b2) determining displacement vectors to be used further as a selection of the displacement vectors determined in step b1), based on at least one predetermined selection criterion, b3) calculating the mathematical transformation on the basis of the displacement vectors selected in step b2).

In one embodiment step c) comprises the following steps:

c1) applying the mathematical transformation for transforming onto one another the two images of the pair of images, c2) determining the difference image by a pixel-by-pixel subtraction of image brightness values of the two images.

In one embodiment the image variation threshold value initially established in step d1) is calculated depending on the image brightness values (actually) occurring in the difference image.

In one embodiment in step d2) the number of image variation points in the form of isolated pixels and/or isolated relatively small cohesive pixel regions in the difference image not exceeding a predetermined maximum number is used as a quality criterion.

In one embodiment one or more criteria used within the scope of the object detection method, in particular, e.g., the quality criterion used in step d2), is/are changeable by a user input.

In one embodiment in step e) the object points are determined respectively as image regions of image variation points lying closely together determined in step d).

According to a still further aspect of the invention a device is provided comprising means for carrying out a method of the type described above in particular comprising an imaging sensor device for generating the video image sequence and a program-controlled computer device (e.g., a processor) for carrying out steps a) through e).

A preferred use of a device of this type or the object detection method carried out therewith can be used for manned or unmanned missiles, in particular for so-called target acquisition or target tracking.

BRIEF DESCRIPTION OF THE DRAWING FIGURES

The invention is further described below based on an exemplary embodiment with reference to the attached drawings. They show.

DETAILED DESCRIPTION

Figure 1:
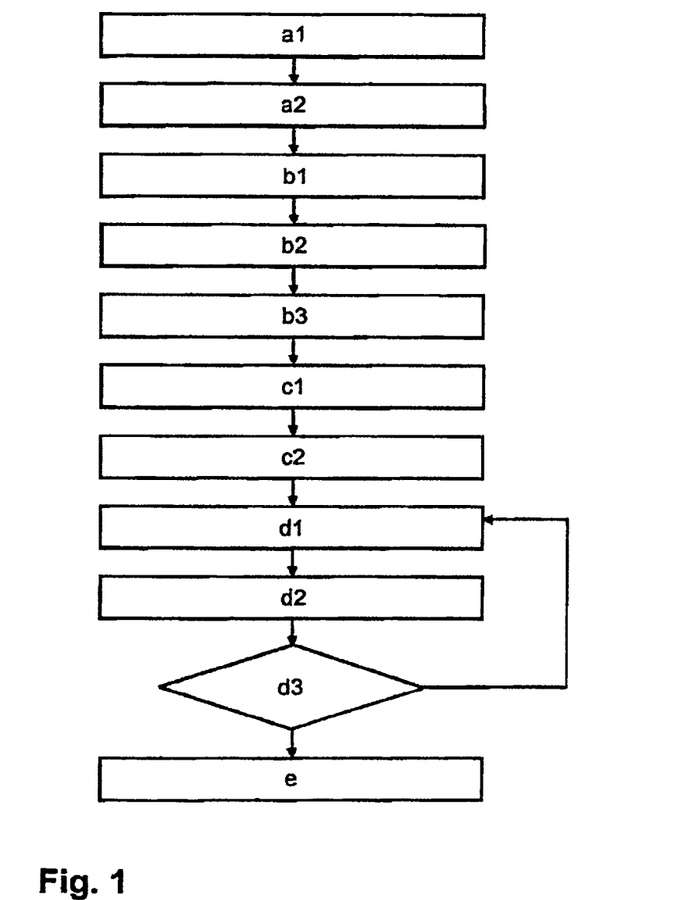
FIG. 1 a complete flow chart of a detection method according to one embodiment.

FIG. 1 shows a flow chart of a method for the detection of moving objects according to an exemplary embodiment of the invention.

The steps carried out with this method are labeled in the figure by a1), a2), b1), b2), b3), c1), c2), d1), d2), d3) and e) and are explained in detail below.

Steps a1) and a2) together form a "step a)" for determining distinctive feature points in one image of a pair of consecutive images of a video image sequence.

Step a1): detecting feature points in one of the two images of the pair of images, respectively in the vicinity of grid points of a previously established grid laid over this image.

The term "feature points" designates locally limited image regions that contain any image structures, that is, image brightness differences.

Figure 2:
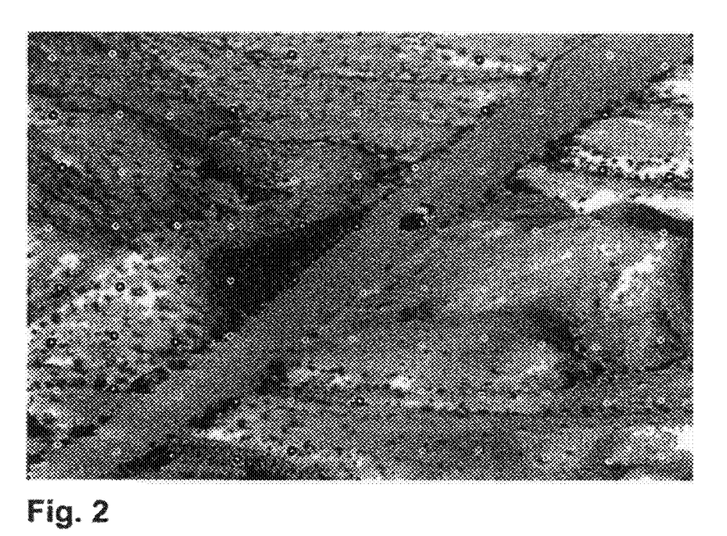
FIG. 2 an exemplary "first image" of a pair of consecutive images of a video image sequence recorded by means of a camera, wherein the positions of determined "feature points" are mapped, FIG. 3 the "first image" and a "second image" of the pair of images in a combined representation, wherein from distinctive feature points that can be assigned to one another in pairs "displacement vectors" determined in the two images are also mapped, FIG. 4 a "difference image" determined by a pixel-by-pixel subtraction of gray values (of the images previously transformed onto one another), FIG. 5 a binary "image variation image" for illustrating a determination of image variation points in the difference image, wherein a quality criterion predetermined for the image variation determination is not met, FIG. 6 an "image variation image" similar to FIG. 5, wherein, however, (after suitable adjustment of an image variation threshold value used in the determination of the image variations) the predetermined quality criterion has been met, and FIG. 7 the "second image" of the pair of images with an image region emphasized therein as a detected "moving object", the position and size of which image region were determined from the distinctive image variation points of the "image variation image" optimized according to FIG. 6.

FIG. 2 illustrates the detection of feature points in a video image recorded by means of an aircraft-based camera. Within the scope of the invention images of any imaging sensors can be processed, including but not limited to electro-optical sensors of light in the visible or infrared spectral range.

In order to be able to detect chronological changes in the images of a video image sequence, at least two chronologically (preferably immediately) consecutive images are required. Further these images are designated as a "first image" (or "previous" image) and as a "second image" (or "current" image) of a pair of images for which the detection method according to the invention is carried out. The sequence illustrated in the flow charge of FIG. 1 is then preferably respectively carried out once in each case for several pairs of images of the video image sequence.

The image shown in FIG. 2 is in this sense is a "first image" of a pair of images of immediately consecutive images of the respective video image sequence.

With the exemplary embodiment described here, the images of the video image sequence respectively have a resolution of approximately 700×500 pixels, wherein the respective image sensor for each pixel assigns the image brightness to one of a total of 256 different image brightness values (grayscale images with a color depth of 8 bits). In the described exemplary embodiment, for example, there are image brightness values from "0" to "255."

In FIG. 2 the positions of the feature points detected in step a1) are distinctive by black and white circles. The determination of the feature points can take place directly in the color image or grayscale image or also in images derived therefrom, such as e.g., gradient images, edge images, etc. With this determination as large a part of the image as possible should be covered. Therefore, in the example shown a type of "grid network" is executed over the entire image. In the example of FIG. 2 this is a square 11×8 grid. Quite generally a grid with at least 30, in particular at least 60 grid points is preferred.

Starting from the "ideal" grid points, the immediate vicinity of these grid points is searched by a software algorithm for feature points in which a relatively large contrast is present. The difference between the largest and the smallest gray value in the region of the feature point can be used e.g., as "contrast." In the example shown, feature points in the form of 31×31 pixel image regions are determined. As a result of step a1) in addition to the feature points the respective positions of these feature points (in image coordinates) are also saved.

Step a2): Determining the distinctive feature points as a selection from the feature points detected in step a1), using at least one predetermined selection criterion.

In this step a selection is made from the feature points previously lying respectively in the vicinity of a grid point. In the illustrated example, based on a suitable criterion for determining a certain quality of the feature points that portion of the feature points is selected that best meets this criterion.

One possible quality criterion is, e.g., a quantitative measurement calculated for each feature point determined in step 1a) for the contrast present in this feature point. The result of the application of this quality criterion can likewise be seen from FIG. 2. The black circles drawn therein mark the positions of the "distinctive feature points" selected in step 2a) (whereas the white circles mark those not selected and thus no longer used for the subsequent further processing (less distinctive feature points).

In the simplest case in step a2) a firmly predetermined proportion of the feature points determined in step a1) is selected, which can be, for example, in the range of 10% to 50%. In the example shown, in step a2) 27 distinctive feature points are selected from the total of 88 feature points determined in step a1), which corresponds to a proportion of 30%.

Deviating from the example shown, as a further (preferably subordinate) quality criterion in step a2) it can also be taken into account that after the selection a large a part as possible of the image is still covered by the selected features points and/or the selected feature points cover the entire image more or less uniformly in order to avoid a strong "overweighting" of a partial image region.

A more uniform distribution is obtained, e.g., if it is required that in each of several predetermined image parts (e.g., image quadrants) respectively a certain proportion (e.g., in the region of 10% to 50%, e.g. approximately 30%) of the most distinctive feature points is selected.

If the latter additional quality criterion were used in the example of FIG. 2, e.g., in the lower right partial image region (e.g., lower right quadrant) more feature points would be shown selected than in FIG. 2 (in black).

The application of step a2) improves the quality of the object detection considerably. A further advantage lies in that the computer expenditure required for the method is reduced in the following processing steps.

Steps b1), b2) and b3) together form a "step b)," which is used to determine a mathematical transformation (to be calculated approximately) that allows imaging the two images of the pair of images on one another, i.e., to determine a corresponding image coordinate transformation or the parameters thereof.

Step b1): determining displacement vectors for each of the distinctive feature points determined in step a) by determining the corresponding distinctive feature points in the other of the two images of the pair of images.

In this step for each "distinctive feature point" the associated position in the "second image" of the respective pair of images (in image coordinates) is determined with a suitable method by a software algorithm. For this purpose, for example, the second image can be searched in a certain radius around the positions of the distinctive feature points previously determined in the first image for matching (i.e., very similar) feature points. Each position thus determined in the second image and the associated position in the first image defines for each distinctive feature point a "displacement vector." The associated feature position in the second image can be defined, e.g., as a position of that 31×31 image region located in the searched radius for which a maximum correlation results (with the distinctive feature point determined in the first image).

The search radius can be firmly predetermined. If the object detection method is carried out within the scope of a so-called target tracking, if information is available from an object detection previously carried out for a different pair of images, this information can optionally be used. The search radius or the region to be searched can be advantageously restricted in order to accelerate this step. In particular, a search restriction of this type can be carried out on the basis of displacement vectors that resulted with the determination previously carried out on a different pair of images.

Each "displacement vector" accordingly characterizes the translational displacement that a feature point undergoes from a first image into the chronologically consecutive second image.

Figure 3:
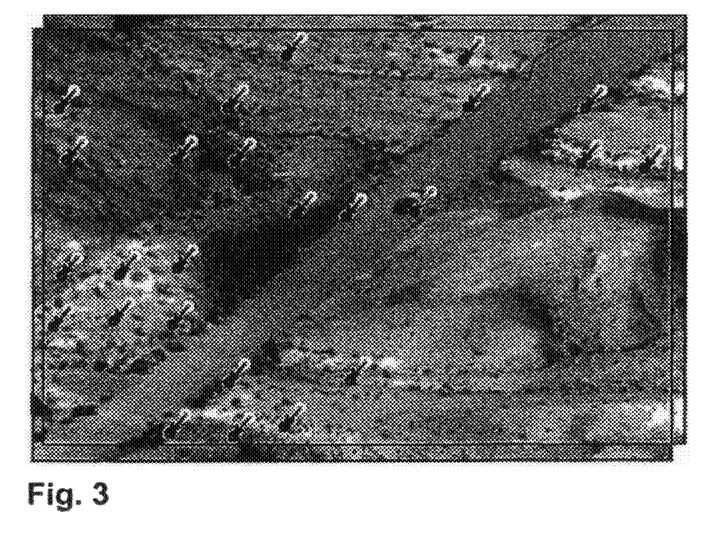

These displacement vectors determined in step b1) are drawn in the combined representation of the first image and the second image according to FIG. 3 as black arrows. They run respectively between a pair of the positions assigned to one another (white circles and black circles in FIG. 3) of the distinctive feature points.

Step b2): determining displacement vectors to be further used as a selection of the displacement vectors determined in step b1), based on at least one predetermined selection criterion.

In this step from the displacement vectors determined in step b1) based on suitable quality criteria by means of a software algorithm displacement vectors are selected which are used for the subsequent further processing.

A quality criterion preferably used, which is selected such that "outliers" are eliminated, i.e., displacement vectors the amount and/or direction of which is not consistent with the residual vector field. In the example of FIG. 3 by the use of this quality criterion the displacement vector (drawn with a thin line in FIG. 3) is eliminated (i.e., not selected), the direction of which and above all the amount of which is not consistent with the residual vector field.

In the example shown, these residual displacement vectors are virtually identical as can be seen from FIG. 3. This special case of the vector field results, e.g., when the aircraft carrying the video camera flies over the recorded scenery at a great height, wherein the observation distance changes only negligibly in the course of the video image sequence.

A completely different type of vector field would result in the case of a coincidence of flight direction and camera axis (observation direction). In this case, displacement vectors can result that are respectively directed in the radial direction with respect to an image center away from this image center or towards this image center.

Which special case respectively applies can be taken into consideration for carrying out step b1), for example by a suitable use or evaluation of flight navigation data (and optionally data regarding a current panning and/or tilt of the camera). Alternatively or additionally for the determination of the displacement vectors further to be used in step b2) first it can be considered to subject the entire vector field (totality of the displacement vectors determined in step b1) to an evaluation in order to stipulate the selection criterion used in step b2) depending on the result of this previous evaluation.

If an evaluation of this type produces the above-mentioned vector field with "radial displacement vectors," for the mentioned elimination of "outliers" each displacement vector determined in step b1) is compared to a displacement vector to be expected for the respective position (on the basis of the evaluation) and optionally (in the case of excessive deviation) is eliminated as an outlier.

Step b3): calculating the mathematical transformation on the basis of the displacement vectors selected in step b2).

With the aid of the previously selected displacement vectors a mathematical transformation of image coordinates of the first image onto image coordinates of the second image is calculated.

For this purpose, e.g., a complete homography can be estimated or, e.g., only individual parameters of a transformation can be determined (only translation in the horizontal and/or vertical image direction). For this purpose, e.g., software algorithms can be used which are known per se from the prior art. A length-consistent transformation is preferably calculated.

Steps c1) and c2) are used to determine a "difference image" as a difference between the transformation determined in step b) of images of the pair of images transformed onto one another.

Step c1): applying the mathematical transformation for transforming onto one another the two images of the pair of images.

In this step the first image is transformed onto image coordinates of the second image with the aid of the previously calculated mathematical transformation. A coordinate range results in which both images overlap. In FIG. 3 the edges of the two images are respectively drawn as a black line.

Step c2): determining the difference image by a pixel-by-pixel subtraction of image brightness values of the two images.

In this step the transformed first image in the overlapping region is subtracted from the second image. In the illustrated exemplary embodiment this results in a difference image that has, according to the extent of the displacement of the two individual images with respect to one another, somewhat fewer pixels that each of the two individual images. The color depth of the difference image is enlarged, however, compared to the color depth of the two individual images. For the example of a color depth of the individual images of 8 bits, the difference image is produced with a color depth of approximately 9 bits.

The difference image thus calculated is saved.

Figure 4:
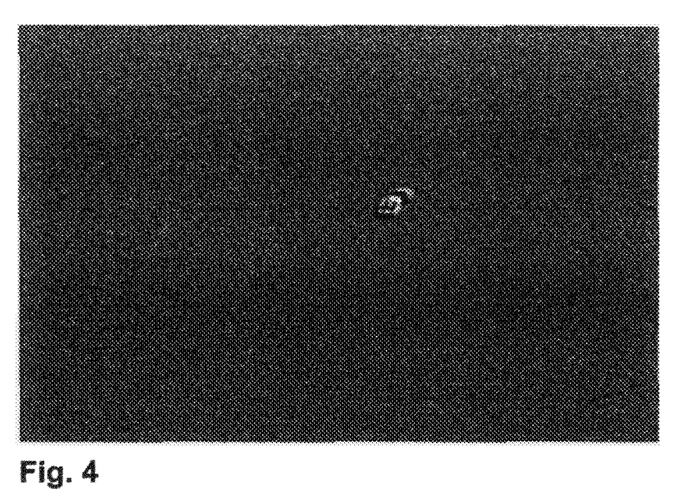

The difference image resulting in the present example is illustrated in FIG. 4. In FIG. 4 the pixels with image brightness values in the range around 0 are shown in gray, the pixels with more positive image brightness values compared thereto are brighter (up to white) and the pixels with more negative image brightness values are darker (up to black).

Steps d1), d2) and d3) are used to determine "distinctive image variation points" from the difference image determined in step c).

Step d1): establishing an image variation threshold value and determining image variation points as those points in the difference image determined in step c), the absolute image brightness value of which exceeds the image variation threshold value.

In the illustrated example the individual images of the video image sequence are recorded with a color depth of 8 bits, corresponding to 256 possible different gray values. With a coding of these gray values with the values of "0" to "255" in the case of a simple mathematical subtraction for the determination of the difference image in step c2) in the difference image a gray value scale results with possible gray values from "−255" to "+255." With the first execution of step d1) the image variation threshold value can be selected e.g., as lying approximately in the center of the gray value scale of the individual images of the pair of images, that is, in the described example predetermined with a value of approximately 128.

Alternatively, it is possible to calculate the image variation threshold value initially established in step d1) depending on the image brightness values (actually) occurring in the difference image.

Then the absolute values of the image brightness values of the difference image are compared pixel by pixel with this image variation threshold value. For all image positions (pixels) in the difference image, the absolute image brightness value of which is not greater than the image brightness threshold value, e.g., a "0" is entered and for all image positions, the absolute image brightness value of which exceeds the image variation threshold value a "1" is entered in an "image variation image" (binary image) generated in step d1). In this image variation image those regions that are marked by a "1" correspond to the image variation points determined in step d1).

Figure 5:
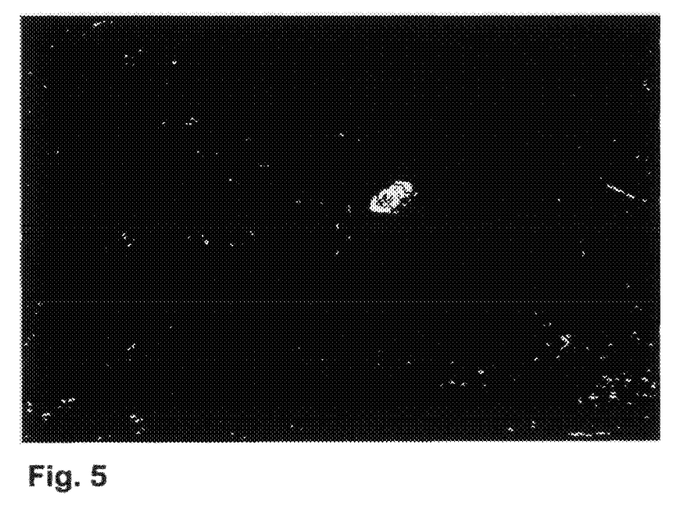

The image variation image resulting in the present example after first execution of step d1) is shown in FIG. 5. The image changes, i.e., image regions with pixel value "1," are shown in white in FIG. 5 and the image regions with the pixel value "0" are shown in black.

Step d2): analyzing the quality of the image variation points determined in step d1) based on at least one predetermined quality criterion.

In this step certain features of the image variations contained in the image variation image are "measured" and subjected to an evaluation based on at least one predetermined quality criterion.

With respect to avoiding false alarms, with the detection method according to the invention in particular, an analysis is performed of how many image changes lying "isolated" in the image variation image, i.e., pixels with the value "1" there are. The term "isolated" can mean in particular the case that all of the directly adjacent 8 adjacent pixels in the image variation image have the value "0." Since such isolated image changes are to be considered as artifacts (due to, for example, image noise etc.) a quality criterion used in step d2) can provide that the quality of the determined image variation points is evaluated better (or a corresponding quality criterion is met), the fewer such isolated image changes are present.

Alternatively or additionally a quality criterion can also be used that evaluates the image variation image as worse, the more image regions formed "of very few (e.g., up to a maximum number) of cohesive pixels with image brightness value "1" exist. Such image changes are also generally to be considered artifacts. A suitable maximum number for this can be selected, e.g., depending on the total number of pixels of the individual images. For example, the maximum number can be selected as a certain percentage of the total number of pixels.

Furthermore, the two above referenced quality criteria can also be modified so that the presence of an "isolation" does not require the value 0 for all direct adjacent pixels, but for this a predetermined minimum number of directly adjacent pixels is sufficient (e.g. at least 4, 5 or 6 adjacent pixels).

Step d3): if the quality criterion is met, establishing the image variation points determined in step d1) as the distinctive image variation points determined in step d), otherwise repetition of the steps d1) and d2) with an image variation threshold value established in a changed manner.

If the quality criterion or criteria used in step d2) are met, processing continues to step e). Otherwise, if the criterion or criteria have not been met, wherein individual or all such criteria optionally also can be provided as changeable by user input, the processing returns to step d1), wherein with such a repetition of the step d1), however, a differently established image variation threshold value is used. The image variation threshold value used with the calculation of the image variations, which is carried out again on the (unchanged) difference image, is thus newly adjusted according to the result of the analysis of step d2). This, with the objective of meeting the quality criterion or criteria (or at least "better meeting" these criteria), is achieved with repeated execution of steps d1) and d2).

If, for example, the quality analysis in the previous step d2) has shown that the quality lies below a predetermined acceptance level, with the repetition of steps d1) and d2) the image variation threshold value is increased (so that the sensitivity of the determination of image variation points in step d1) is correspondingly reduced). Vice versa, if the evaluation of the quality leads to a result that exceeds the predetermined acceptance level by a certain (e.g., fixedly or variably set) extent, a repetition of steps d1) and d2) can be carried out with a reduced image variation threshold value (i.e., with an increased sensitivity for the determination of image variation points).

The use of steps d1), d2) and d3) thus advantageously renders possible an iterative improvement in the quality of the image variation points determined in step d1) or of the hereby determined image variation image.

After the conclusion of this optimization, the processing continues to step e). In the event that an iterative optimization of this type fails, which can be assumed in the case in which a predetermined maximum number of repetitions of the steps d1) and d2) has been achieved (without acceptable quality improvement), the processing section comprising steps d1), d2) and d3) can also be terminated as without result, which in turn leads to a termination without result of the entire object detection method for the respective pair of images.

Figure 6:
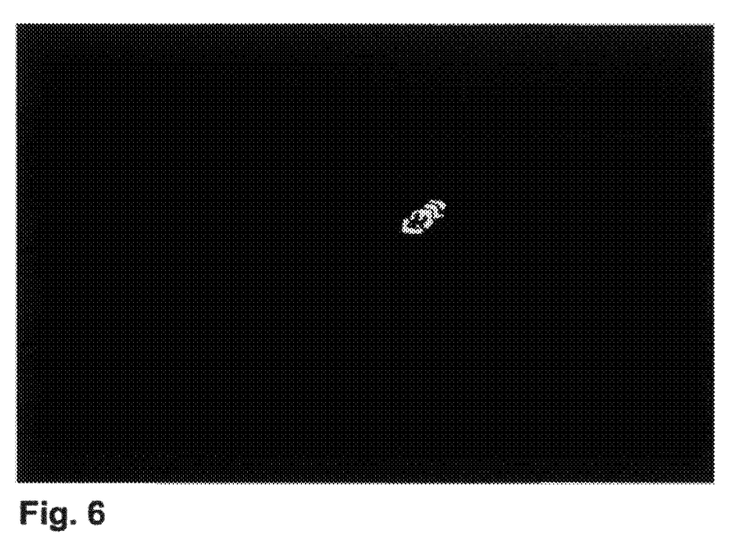

In the example described here the image variation image shown in FIG. 6 results from this iterative quality improvement. As can be seen in FIG. 6, now relatively large cohesive image variations closely adjacent to one another are contained, which evidently were caused by a moving object located at this point in the image.

Step e): determining object points from the image variation points determined in step d), In this step the moving objects are determined with a suitable method in a program-controlled manner from the remaining image variations i.e., located in the last calculated image variation image (FIG. 6).

Figure 7:
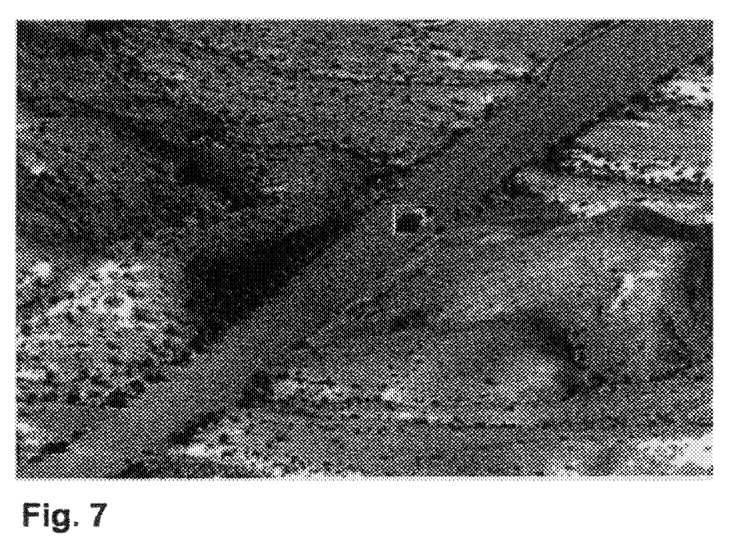

In this step relatively closely adjacent (e.g., closer than a fixed predetermined maximum distance or one that can be predetermined by user input) image variations respectively having a certain minimum size (e.g., larger than a firmly predetermined minimum size or one that can be predetermined by user input) are considered assigned to a certain (moved) object. Accordingly, this object point determination leads from step e) in the example shown to the result that on the basis of the respective pair of images a moving object (discernible in the figures approximately in the image center) is detected. FIG. 7 shows the "second image" of this pair of images, wherein therein a position frame on the basis of the result of step e) marks the position and size of the detected moving object.

Naturally, the method described above by way of example can then be applied to further pairs of images of the video image sequence, wherein the "first image" of such a pair of images to be processed subsequently can be the "second image" of the previously processed pair of images.

The described object detection method can be used, for example, particularly advantageously within the scope of a target acquisition or target tracking, wherein in the case of several detected moving objects a particular identification is preferably assigned to each object.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for the detection of moving objects in a video image sequence, comprising the steps:
    a) determining, by a processor, distinctive feature points in one image of a pair of consecutive images of the video image sequence;
    b) determining, by the processor, a mathematical transformation for imaging one of the two images of the pair of images onto the other of the two images of the pair of images, using the distinctive feature points determined in step a);
    c) determining, by the processor, a difference image as a difference between the images of the pair of images transformed onto one another by means of transformation determined in step b);
    d) determining, by the processor, distinctive image variation points in the difference image determined in step c);
    e) determining, by the processor, object points from the distinctive image variation points determined in step d), wherein step d) comprises the following steps
        d1) establishing an image variation threshold value and determining image variation points as those points in the difference image determined in step c) with an absolute image brightness value that exceeds the image variation threshold value,
        d2) analyzing the quality of the image variation points determined in step d1) based on at least one predetermined quality criterion,
        d3) if the quality criterion is met, establishing the image variation points determined in step d1) as the distinctive image variation points determined in step d), and otherwise repeating steps d1) and d2) with a different image variation threshold value.

2. The method according to claim 1, wherein step a) comprises the following steps:
    a1) detecting feature points in one of the two images of the pair of images, respectively in a vicinity of grid points of a pre-established grid that is laid over the one of the two images of the pair of images,
    a2) determining the distinctive feature points as a selection of the feature points detected in step a1) using at least one predetermined selection criterion.

3. The method according to claim 1, wherein step b) comprises the following steps:
    b1) determining displacement vectors for each of the distinctive feature points determined in step a) by determining corresponding distinctive feature points in the other of the two images of the pair of images,
    b2) determining displacement vectors to be used further as a selection of the displacement vectors determined in step b1), based on at least one predetermined selection criterion,
    b3) calculating the mathematical transformation on the basis of the displacement vectors selected in step b2).

4. The method according to claim 1, wherein step c) comprises the following steps:
    c1) applying the mathematical transformation onto one another the two images of the pair of images,
    c2) determining the difference image by a pixel-by-pixel subtraction of image brightness values of the two images.

5. The method according to claim 4, wherein the image variation threshold value initially established in step d1) is calculated depending on the image brightness values occurring in the difference image.

6. The method according to claim 1, wherein in step d2) the number of image variation points in the form of isolated pixels in the difference image not exceeding a predetermined maximum number is used as the quality criterion.

7. The method according to claim 1, wherein the quality criterion used in step d2), is changeable by receipt of a user input.

8. The method according to claim 1, wherein in step e) the object points are determined respectively as image regions of image variation points lying closely together determined in step d).

9. A device for the detection of moving objects in a video image sequence, comprising:

an imaging sensor device configured to generate the video image sequence; and a program-controlled computer device configured to
- a) determine distinctive feature points in one image of a pair of consecutive images of the video image sequence;
- b) determine a mathematical transformation for imaging one of the two images of the pair of images onto the other of the two images of the pair of images, using the distinctive feature points determined in a);
- c) determine a difference image as a difference between the images of the pair of images transformed onto one another by means of transformation determined in b);
- d) determine distinctive image variation points in the difference image determined in c);
- e) determine object points from the distinctive image variation points determined in d), wherein the program-controlled computer device is configured to performed the determination in d) by
- d1) establishing an image variation threshold value and determining image variation points as those points in the difference image determined in step c) with an absolute image brightness value that exceeds the image variation threshold value,
- d2) analyzing the quality of the image variation points determined in step d1) based on at least one predetermined quality criterion,
- d3) if the quality criterion is met, establishing the image variation points determined in step d1) as the distinctive image variation points determined in step d), and otherwise repeating steps d1) and d2) with a different image variation threshold value.

10. A method for the detection of moving objects in a video image sequence, comprising the steps:
- a) determining, by a processor, distinctive feature points in one image of a pair of consecutive images of the video image sequence;
- b) determining, by the processor, a mathematical transformation for imaging one of the two images of the pair of images onto the other of the two images of the pair of images, using the distinctive feature points determined in step a);
- c) determining, by the processor, a difference image as a difference between the images of the pair of images transformed onto one another by means of transformation determined in step b);
- d) determining, by the processor, distinctive image variation points in the difference image determined in step c) by successively applying an adaptive image variation threshold value to the difference image, wherein the adaptive image variation threshold value is adjusted between successive applications to the difference image based on whether image variation points determined in a prior application of the adaptive image variation threshold exceed a predetermined quality criterion;
- e) determining, by the processor, object points from the distinctive image variation points determined in step d); and detecting a moving object using the object points determined in step e).

11. The method according to claim 10, wherein step a) comprises the following steps:
- a1) detecting feature points in one of the two images of the pair of images, respectively in a vicinity of grid points of a pre-established grid that is laid over the one of the two images of the pair of images,
- a2) determining the distinctive feature points as a selection of the feature points detected in step a1) using at least one predetermined selection criterion.

12. The method according to claim 10, wherein step b) comprises the following steps:
- b1) determining displacement vectors for each of the distinctive feature points determined in step a) by determining corresponding distinctive feature points in the other of the two images of the pair of images,
- b2) determining displacement vectors to be used further as a selection of the displacement vectors determined in step b1), based on at least one predetermined selection criterion,
- b3) calculating the mathematical transformation on the basis of the displacement vectors selected in step b2).

13. The method according to claim 10, wherein step c) comprises the following steps:
- c1) applying the mathematical transformation onto one another the two images of the pair of images,
- c2) determining the difference image by a pixel-by-pixel subtraction of image brightness values of the two images.

14. The method according to claim 13, wherein the adaptive image variation threshold value is calculated depending on the image brightness values occurring in the difference image.

15. The method according to claim 10, wherein the quality criterion is the number of image variation points in the difference image that are isolated pixels.

16. The method according to claim 10, wherein the quality criterion is changeable by receipt of a user input.

17. The method according to claim 10, wherein in step e) the object points are determined respectively as image regions of image variation points lying closely together determined in step d).

18. The method according to claim 10, wherein the quality criterion is based on a number of image regions formed of a predetermined number of cohesive pixels with a particular image brightness value.

19. The method according to claim 1, wherein the quality criterion is based on a number of image regions formed of a predetermined number of cohesive pixels with a particular image brightness value.

* * * * *